US012159983B2

(12) United States Patent
Riemer et al.

(10) Patent No.: US 12,159,983 B2
(45) Date of Patent: Dec. 3, 2024

(54) SENSORED BATTERY POUCH (71) Applicant: Hutchinson Technology Incorporated, Hutchinson, MN (US)

(72) Inventors: Douglas P. Riemer, Waconia, MN (US); Michael W. Davis, Rockford, MN (US); Peter F. Ladwig, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 228 days.

(21) Appl. No.: 16/558,926

(22) Filed: Sep. 3, 2019

(65) Prior Publication Data
US 2020/0076016 A1    Mar. 5, 2020

Related U.S. Application Data (60) Provisional application No. 62/792,815, filed on Jan. 15, 2019, provisional application No. 62/726,668, filed on Sep. 4, 2018.

(51) Int. Cl.
| | |
|---|---|
| *H01M 10/48* | (2006.01) |
| *H01M 10/615* | (2014.01) |
| *H01M 10/6571* | (2014.01) |
| *H01M 50/105* | (2021.01) |
| *H01M 50/119* | (2021.01) |
| *H01M 50/121* | (2021.01) |
| *H01M 50/124* | (2021.01) |

(52) U.S. Cl.
CPC ......... *H01M 10/486* (2013.01); *H01M 10/48* (2013.01); *H01M 10/615* (2015.04); *H01M 10/6571* (2015.04); *H01M 50/105* (2021.01); *H01M 50/119* (2021.01); *H01M 50/121* (2021.01); *H01M 50/124* (2021.01)

(58) Field of Classification Search
CPC ............ H01M 10/486; H01M 50/124; H01M 10/615; H01M 10/48; H01M 10/6571; H01M 50/116; H01M 10/0436; H01M 10/425; H01M 50/10
See application file for complete search history.

(56) References Cited

U.S. PATENT DOCUMENTS

| | | | |
|---|---|---|---|
| 8,828,570 B2 | 9/2014 | Banerjee et al. | |
| 9,040,186 B2 | 5/2015 | Lev et al. | |
| 9,389,279 B2 * | 7/2016 | Bober | H01M 10/615 |
| 9,573,484 B2 | 2/2017 | Phlegm et al. | |

(Continued)

FOREIGN PATENT DOCUMENTS

| | | |
|---|---|---|
| CN | 102576915 A | 7/2012 |
| CN | 102947683 A | 2/2013 |

(Continued)

OTHER PUBLICATIONS

Mutyala et al. "In-situ temperature measurement in lithium ion battery by transferable flexible thin film thermocouples." Journal of Power Sources 260 (2014) 43-49 (Year: 2014).*

(Continued)

*Primary Examiner* — Michael L Dignan
(74) *Attorney, Agent, or Firm* — DLA Piper LLP (US)

(57) ABSTRACT

A battery pouch is described. The battery pouch including an outer layer and an inner layer disposed on the outer layer. The inner layer including at least one sensor.

18 Claims, 13 Drawing Sheets

(56) References Cited

U.S. PATENT DOCUMENTS

| | | |
|---|---|---|
| 9,653,724 B2 | 5/2017 | Lim |
| 9,947,812 B2 | 4/2018 | Harley et al. |
| 2005/0037163 A1 | 2/2005 | Wu et al. |
| 2006/0034346 A1 | 2/2006 | Saio et al. |
| 2010/0177800 A1 | 7/2010 | Rud et al. |
| 2010/0310930 A1* | 12/2010 | Park .................. H01M 50/116 429/185 |
| 2011/0039137 A1* | 2/2011 | Engle ................. H01M 10/486 429/90 |
| 2012/0026099 A1 | 2/2012 | Harley |
| 2012/0299555 A1* | 11/2012 | Tam .................. H02J 7/0071 320/162 |
| 2013/0209868 A1* | 8/2013 | Suzuta ............... H01M 50/145 429/176 |
| 2013/0216867 A1 | 8/2013 | Schaefer et al. |
| 2013/0236755 A1* | 9/2013 | Goldberg ............ H01M 10/48 429/90 |
| 2014/0036953 A1* | 2/2014 | Kimura ................. G01J 5/16 438/54 |
| 2014/0147703 A1 | 5/2014 | Werner et al. |
| 2015/0132621 A1 | 5/2015 | Henrici et al. |
| 2015/0171489 A1 | 6/2015 | Inaba et al. |
| 2015/0340744 A1 | 11/2015 | Knobloch et al. |
| 2017/0117725 A1 | 4/2017 | Hendricks et al. |
| 2017/0338535 A1 | 11/2017 | Bhoir |
| 2018/0151918 A1* | 5/2018 | Boovaragavan .. H01M 10/0436 |
| 2018/0151922 A1* | 5/2018 | Ito ..................... H01M 50/176 |
| 2020/0281074 A1* | 9/2020 | Okimoto ............. H05K 1/0283 |

FOREIGN PATENT DOCUMENTS

| | | | |
|---|---|---|---|
| CN | 105300540 A | 2/2016 | |
| CN | 105594055 A | 5/2016 | |
| CN | 108123169 A | 6/2018 | |
| DE | 10 2010 043 710 A1 | 5/2012 | |
| JP | 5-149796 A | 6/1993 | |
| JP | 2006-78478 A | 3/2006 | |
| JP | 2014-103055 A | 6/2014 | |
| JP | 2017-224451 | * 12/2017 | ............ H01M 10/04 |
| JP | 2017-224451 A | 12/2017 | |
| JP | 2018-88311 A | 6/2018 | |
| JP | 2018-137078 A | 8/2018 | |
| WO | 2012/062574 A1 | 5/2012 | |

OTHER PUBLICATIONS

Mattana et al. "Woven Temperature and Humidity Sensors on Flexible Plastic Substrates for E-Textile Applications." IEEE Sensors Journal, vol. 13, No. 10, Oct. 2013 (Year: 2013).*

Machine English translation of JP 2017-224451 (Year: 2017).*

Energus Power Solutions Ltd., "Li-ion building block Li4P25RT", Li4P25RT datasheet, revision A, Jan. 16, 2017.

Fleming, J. et al., "Development and Evaluation of in-Situ Sensors for Li-Ion Cells", The University of Warwick, WMG, 2018.

Goutam, S. et al., "Comparative Study of Surface Temperature Behavior of Commercial Li-Ion Pouch Cells of Different Chemistries and Capacities by Infrared Thermography", Energies, vol. 8, Issue 8, pp. 8175-8192, Aug. 2015.

Lee, Chi-Yuan et al., "In situ monitoring of temperature using flexible micro temperature sensors inside polymer lithium-ion battery", 2012 7th IEEE International Conference on Nano/Micro Engineered and Molecular Systems (NEMS), Kyoto, 2012, pp. 698-701.

International Search Report and Written Opinion in International Application No. PCT/US2019/049604, mailed Nov. 26, 2019.

International Preliminary Report on Patentability in International Application No. PCT/US2019/049604, mailed Mar. 18, 2021.

Extended European Search Report in European Application No. 19858176.1, dated Apr. 11, 2022.

Office Action in Chinese Application No. 201980059382.6, dated Nov. 2, 2022.

Office Action in Chinese Application No. 201980059382.6, dated Jul. 7, 2023.

Notification of Reasons for Rejection in Japanese Application No. 2021-536682, dated Aug. 22, 2023.

Office Action in Chinese Application No. 201980059382.6, dated Nov. 20, 2023.

Decision of Rejection in Chinese Application No. 201980059382.6, dated Mar. 19, 2024.

Notice of Reasons for Rejection in Japanese Application No. 2021-536682, dated Mar. 5, 2024.

* cited by examiner

SENSORED BATTERY POUCH

CROSS-REFERENCE TO RELATED APPLICATIONS

This application claims the benefit of U. S. Provisional Application No. 62/726,668 filed on Sep. 4, 2018 and U.S. Provisional Application No. 62/792,815 filed on Jan. 15, 2019, each of which is hereby incorporated by reference in their entireties.

FIELD

Embodiments of the invention relate to batteries. In particular, embodiments of the invention relate generally to sensors for batteries.

BACKGROUND

Batteries for mobile electronic devices are critical for the operation of the mobile electronic devices. As mobile electronic devices decrease in size and the demand on the batteries increases the operating characteristic of the battery becomes more important. Further, the desire to reduce charging times of a battery without damaging a battery has become a key feature. For example, the operating temperature of a battery can affect the life of a battery and the operation of the electronic devices that rely on the battery.

SUMMARY

A battery pouch is described. The battery pouch including an outer layer and an inner layer disposed on the outer layer. The inner layer including at least one sensor.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
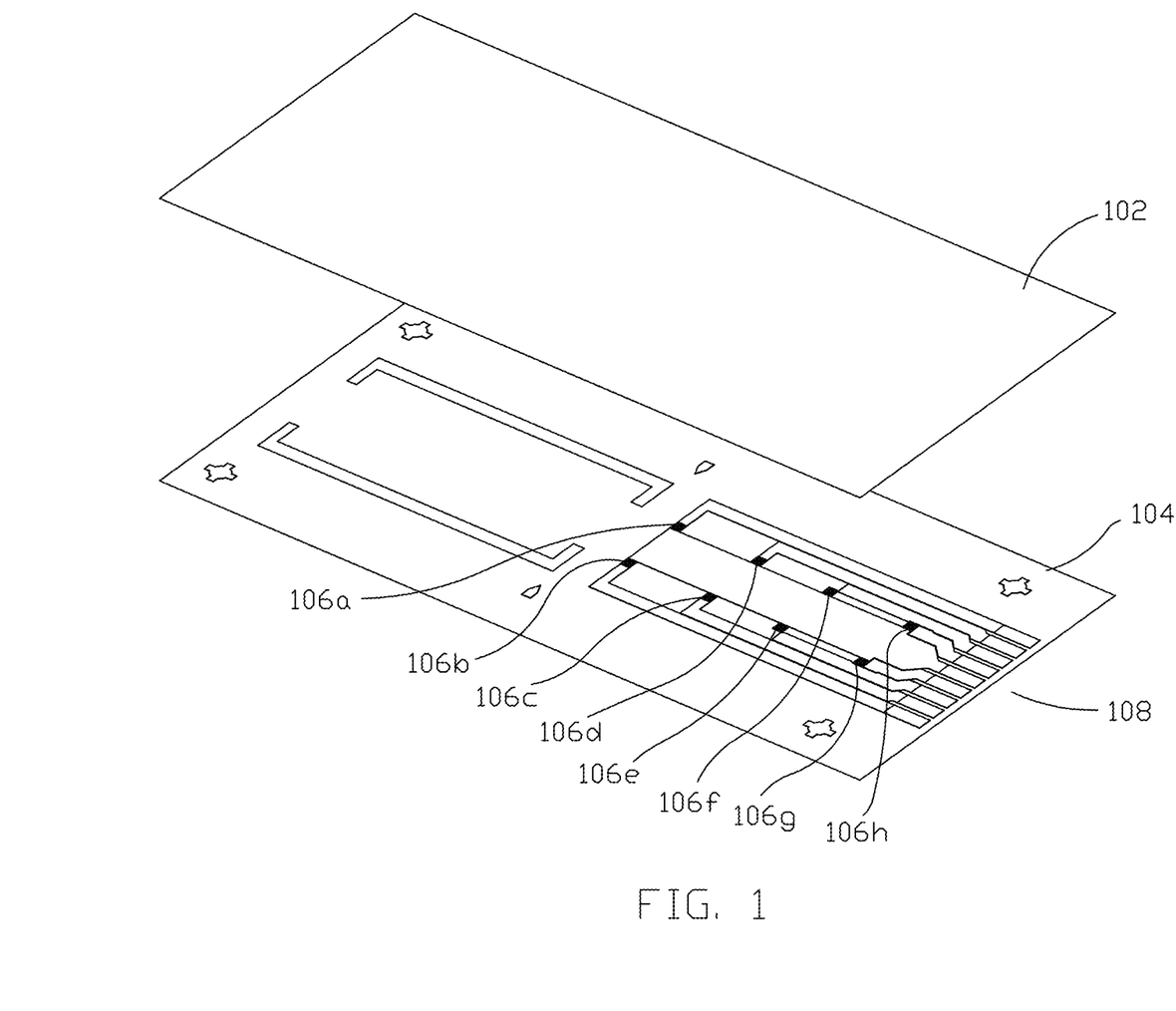
FIG. 1 illustrates a sensored battery pouch according to an embodiment.

A sensor for a battery pouch and methods of manufacturing in accordance with embodiments of the invention are described. FIG. 1 illustrates a sensored battery pouch according to an embodiment. The battery pouch includes an outer layer 102 and an inner layer 104. The outer layer 102 is a polymer film. For some embodiments, the outer layer 102 is a polymer film including a layer of polyamide, a layer of aluminum, and a poly propylene layer. The inner layer 104 is a polymer film, for some embodiments. However, an inner layer 104 may also be formed of other materials that are compatible with battery assembly processes including those materials known in the art. For some embodiments, the inner layer 104 is a heat bondable material, such as a polypropylene film.

The inner layer 104 includes one or more sensors 106a-h disposed on the inner layer 104. For various embodiments, the one or more sensors 106a-h are formed on the inner layer 104 using deposition and etch techniques. For other embodiments, the one or more sensors 106a-h is formed on a film separated from the inner layer 104 and affixed to the inner layer 104. For example, the one or more sensors 106a-h are formed on a film and affixed to the inner layer 104 using laminating techniques or an adhesive.

For some embodiments, the sensors 106a-h are configured as an array of multiple sensors. The sensors 106a-h are connected to one or more electrical traces and electrically coupled with one or more electrical contacts 108. The electrical contacts 108 include, but are not limited to, contact pads, zero insertion force connections, or other styles to make electrical communication with another circuit. The electrical contacts 108 are configured to extend beyond the outer layer 102, according to some embodiments, so that the sensors 106a-h can be in electrical communication with one or more circuits outside of the battery pouch. The one or more circuits could include, but are not limited to, control circuits and monitoring circuits. For example, the one or more circuits outside the battery pouch could be configured to optimize the performance of a battery.

The sensor disposed on an inner layer of a battery pouch can include, but is not limited to, a temperature sensor, a strain gauge, a capacitance sensor, a gas detector, pH detector, moisture detector, relative humidity detector, and reference voltage detector. One or more sensor may be disposed on the same layer or a different layer of the inner layer. For example, multiple metal layers and multiple insulating layers may be disposed on an inner layer to form one or more sensors and circuits. For some embodiments, multiple inner layers may be used with each inner layer including one or more sensor.

A strain gauge is configured to provide internal pressure detection of one or more sections within the battery pouch. For some embodiments, a strain gauge is formed using a metallic Constantan disposed on an inner layer, such as an insulating layer, using techniques described herein. For example, one or more strain gauges can be used to determine gas generation within the battery pouch and that can result in a bulging battery. The gases are produced due to electrochemical oxidation of the electrolyte. Such oxidation occurs usually due to overcharging of the battery due to a faulty battery or faulty charging electronics in the phone or battery charger.

A capacitance sensor is configured to provide internal pressure detection of one or more sections within the battery pouch. For example, a capacitance sensor can be used to determine gas generation within a battery pouch. Using an alternating current, the capacitance is determined based on the gap between the first plate and a second plate, such as a reference plate. The greater the capacitance the closer the plates are together. As the capacitance decreases, the gap between the plates increases. This change can be used to determine the buildup of gas in the battery pouch. For some embodiments, the capacitive sensor is a capacitive plate sensor. One plate of the capacitive plate sensor is disposed on an inner layer of a battery pouch while the second reference plate of the capacitive plate sensor is a ground plate of the batter cell. For such embodiments, as the gas builds up in the battery pouch the gap between the plates would increase, so as the capacitance decreases this would indicate a buildup of gas in the batter pouch. However, other embodiments could arrange the plates such that an increase in capacitance would indicate a buildup of gas in the batter pouch. For some embodiments, the second reference plate is another reference plate incorporated in the battery, including, but not limited to, a reference plate inserted into a battery cell subassembly and an aluminum layer in the battery pouch.

For some embodiments, a reference voltage detector is a lithium metal coated in a lithium salt. Examples of a lithium salt include, but are not limited to, lithium hexafluorophosphate ("$LiPF_6$") and lithium tetrafluoroborate ("$LiBF_4$"). For some embodiments, the lithium salt used is in common with the battery electrolyte, but not in contact with anode, cathode, or any current collector.

A temperature sensor includes, but is not limited to, a resistance temperature detector, a thermocouple, a thermopile, and a thermistor. The temperature sensor is configured to provide temperature information of one or more sections of a battery cell formed within the battery pouch. For some embodiments, a resistance temperature detector is configured as a resistive heating element. For a resistance temperature detector configured as a resistive heating element, the resistance temperature detector is electrically coupled electrically coupled with electrical contacts that will receive current to pass through the resistance temperature detector such that it generates heat. For some embodiments, a resistance temperature detector is configured to be operated as both a resistive heating element and a temperature sensor. Having a resistive heating element within the battery pouch enables pre-warming of the battery before charging to reduce battery degradation, such as electroplating of the poles.

One or more types of a sensor, according to some embodiments, are formed in an array so that one or more types of a sensor are configured to provide information about different sections of a battery cell within the battery pouch. For some embodiments, the side of the polymer film of the inner layer opposite of the sensor is metalized to form vias and/or other metal shapes to help dissipate heat from the battery cell. Some embodiments include forming mounting pads from a metal layer formed on the side of the polymer film of the inner layer that can be used to mount surface-mount technology ("SMT") components to the inner layer. Some embodiments include forming mounting temperature sensors on both sides of the polymer film of the inner layer to use for calculating heat flux of the battery cell. Some embodiments include forming a coil from a metal layer formed on the side of the polymer film of the inner layer that can be used for wireless charging or energy harvesting.

Figure 2:
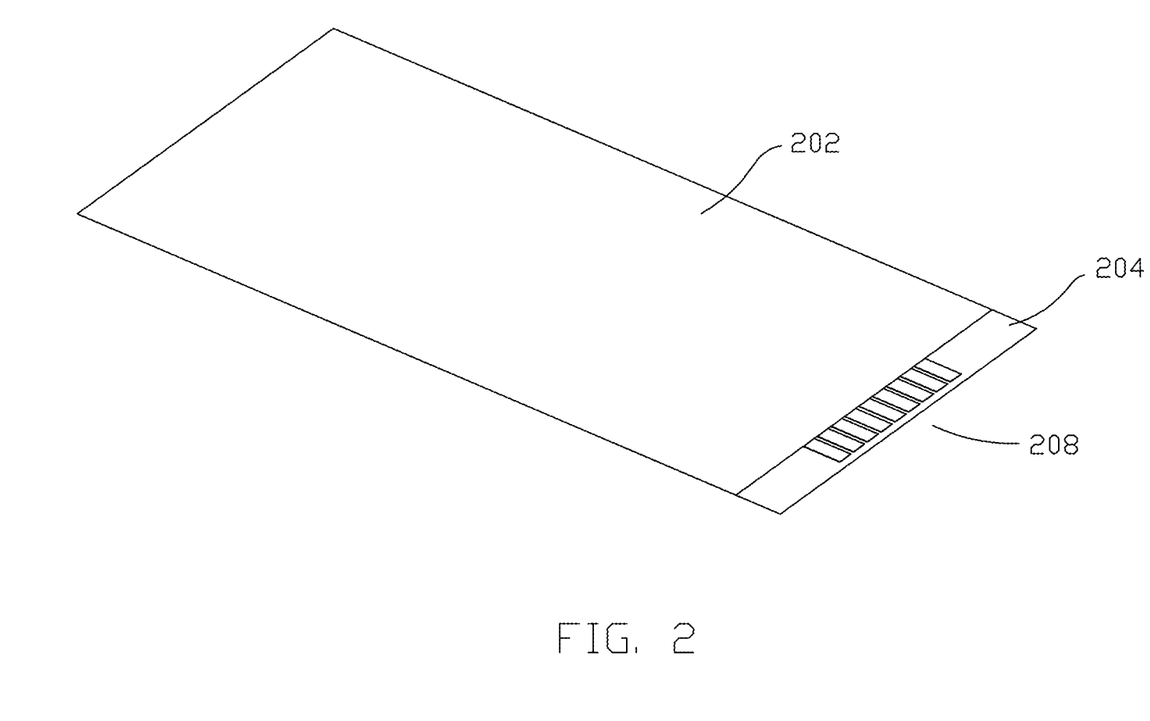
FIG. 2 illustrates a sensored battery pouch according to an embodiment.

FIG. 2 illustrates a sensored battery pouch according to an embodiment. The outer layer 202 of the sensored battery pouch is affixed to the inner layer 204. For some embodiments, the outer layer 202 is laminated to the inner layer 204 using heat. Other embodiments include using a bonding adhesive to affix the outer layer 202 to the inner layer 204. The outer layer 202, according to some embodiments, is affixed to the inner layer 204 using a hot melt film applied between the inner layer 204 and the outer layer 202.

Figure 3:
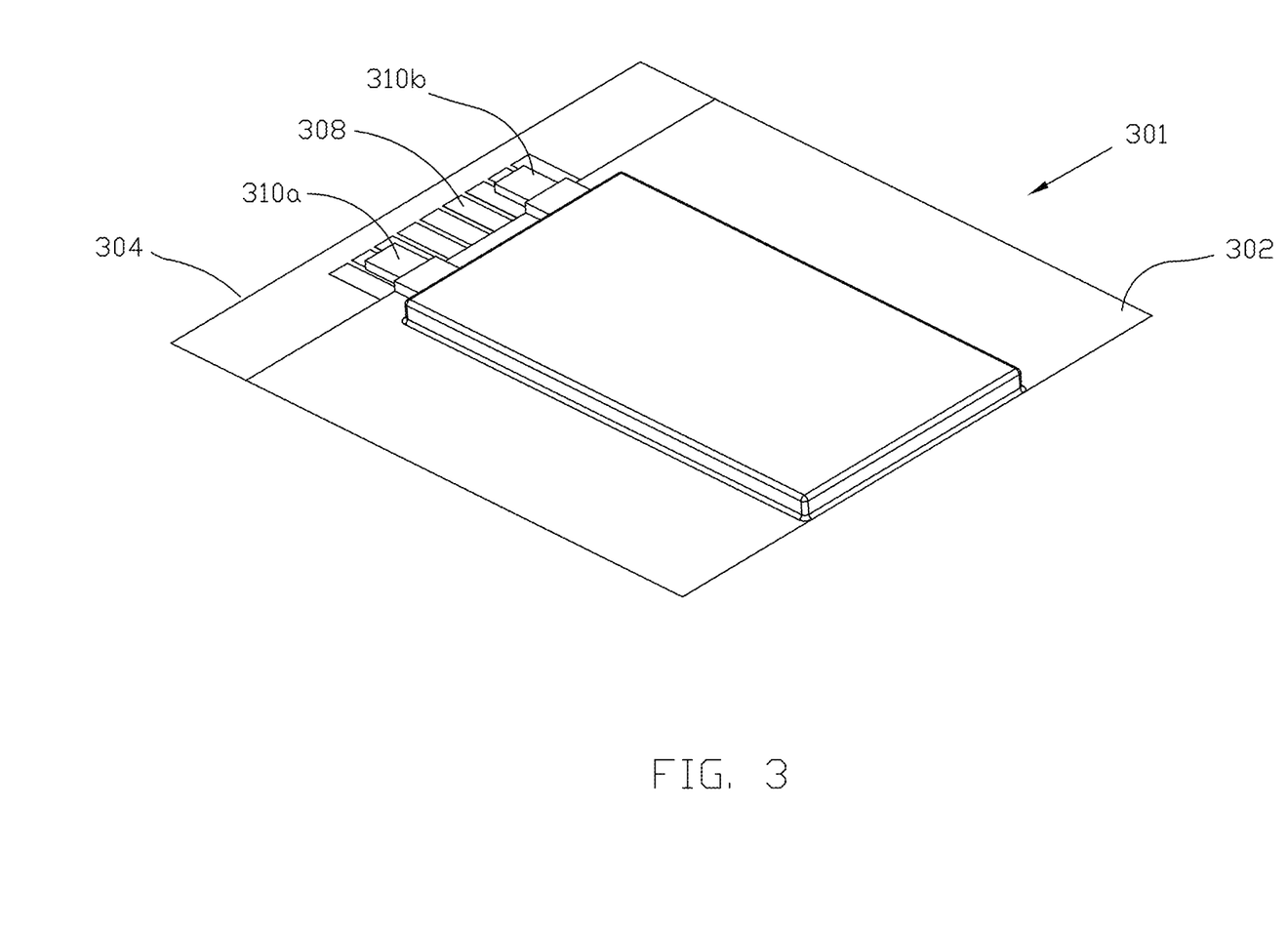
FIG. 3 illustrates a battery formed using a sensored battery pouch according to an embodiment.

FIG. 3 illustrates a battery formed using a sensored battery pouch according to an embodiment. The sensored battery pouched 301 including an outer layer 302 and an inner layer 304 including sensors such as those described herein. The battery is formed by forming the sensored battery pouch 301 such as those described herein and folding the outer layer 302 and the inner layer 304 to form a pouch. Two sides of the sensored battery pouched 301 are sealed using techniques including heat sealing, heat melt sealing film, or other adhesive. The sensored battery pouch 301 is then filled with one or more electrodes and an electrolyte from the remaining open side of the sensored battery pouch 301 to form a battery cell using techniques including those known in the art. The remaining open side of the sensored battery pouch 301 is sealed using techniques including those described herein.

Once the sensored battery pouch 301 is formed and sealed, the electrical contacts 308 are on the outside of the sensored battery pouch 301 according to an embodiment. As described herein, the electrical contacts 308 are configured to provide electrical communication with the one or more sensors disposed on the inner layer 304 of the sensored battery pouch 301. The electrical contacts 308 are isolated from battery terminals 310a,b by the inner layer 301 as the electrical contacts 308 are disposed on a face of the inner layer 301, such that when the sensored battery pouch 301 is formed, the electrical contacts 308 are on the face of the inner layer 301 opposite from the face adjacent to the battery terminals 310a,b.

Positioning the sensors on the inside surface of the battery pouch as described herein provides for more precise measurement compared to if temperature sensors were arrayed outside of an aluminum layer, such as that used in current battery pouches, because the aluminum will act as a heat spreader and reduce the 'hot spot' sensitivity. Further, having sensors on the inside surface of the battery pouch provides the ability to measure detailed heat mapping of the battery during charging which can enable maximizing of the charge speed of the battery. For example, a charge controller can supply more power until a safety temperature is seen. Heat mapping during discharge enabled by the sensors on the inside surface of the battery pouch could also be used for safety or performance enhancing functions as well.

By incorporating the sensors into the battery pouch, according to embodiments describe herein, the manufacturing process and assembly methods used for battery assembly can remain virtually unchanged. This allows for a battery formed using a sensored battery pouch to be constructed with virtually no changes in the manufacturing process of the battery, which leads to seamless integration into the supply chain and rapid adoption. Further, the ability to dispose one or more sensors on any position of the inner layer of a battery pouch provides the ability to monitor discrete portions of one or more faces of a battery cell disposed in the battery pouch to better detect hotspots in the battery cell or other problems.

Figure 4:
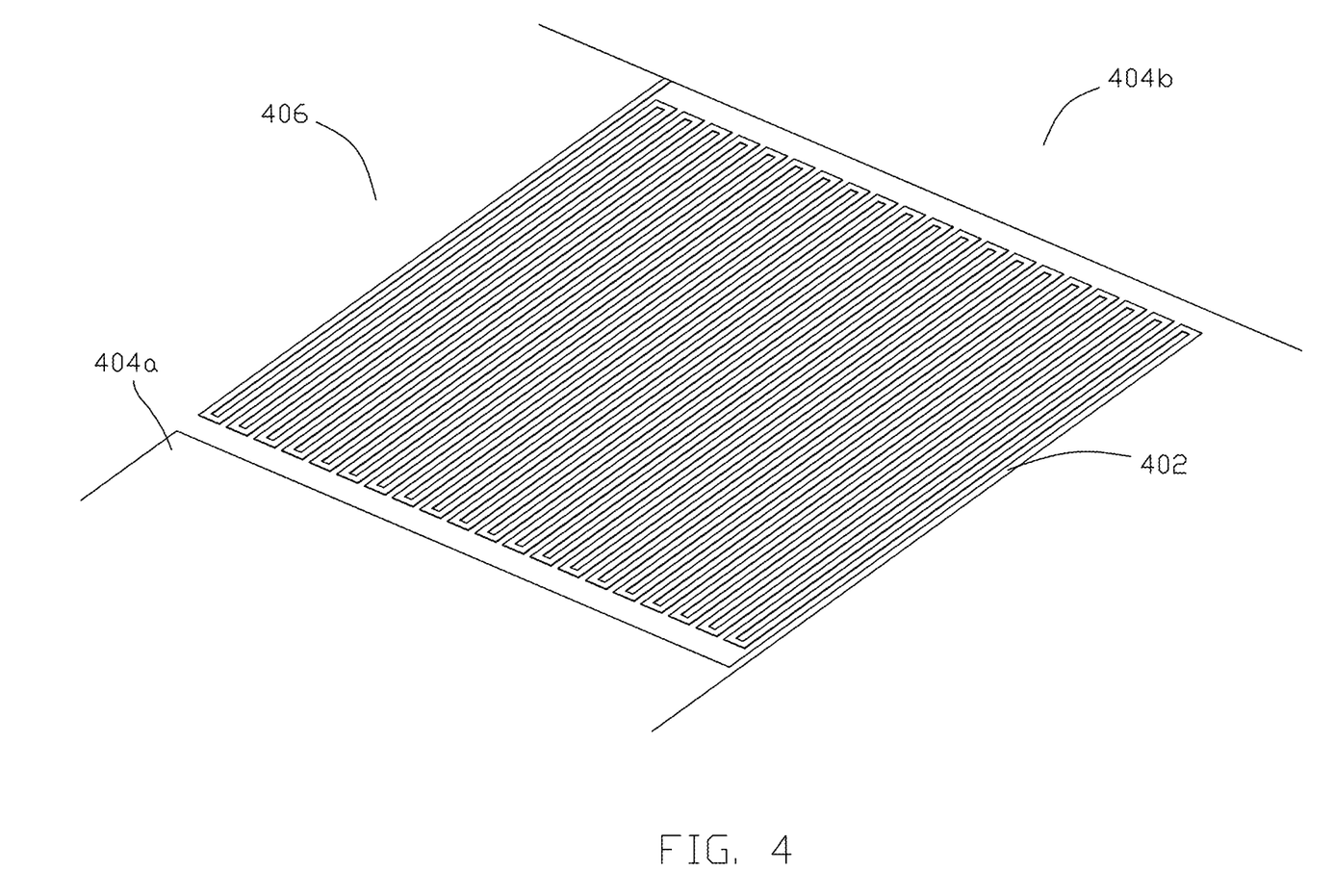
FIG. 4 illustrates a temperature sensor according to an embodiment.

FIG. 4 illustrates a temperature sensor according to an embodiment. The temperature sensor 402 is configured as a resistance temperature detector electrically coupled with a first electrical trace 404a and a second electrical trace 404b. The temperature sensor 402 is configured as a serpentine line disposed on a polymer film 406. The serpentine line is electrically connected to the first electrical trace 404a at a first end of the serpentine line and is electrically connected to the second electrical trace 404b at a second end of the serpentine line.

Figure 5:
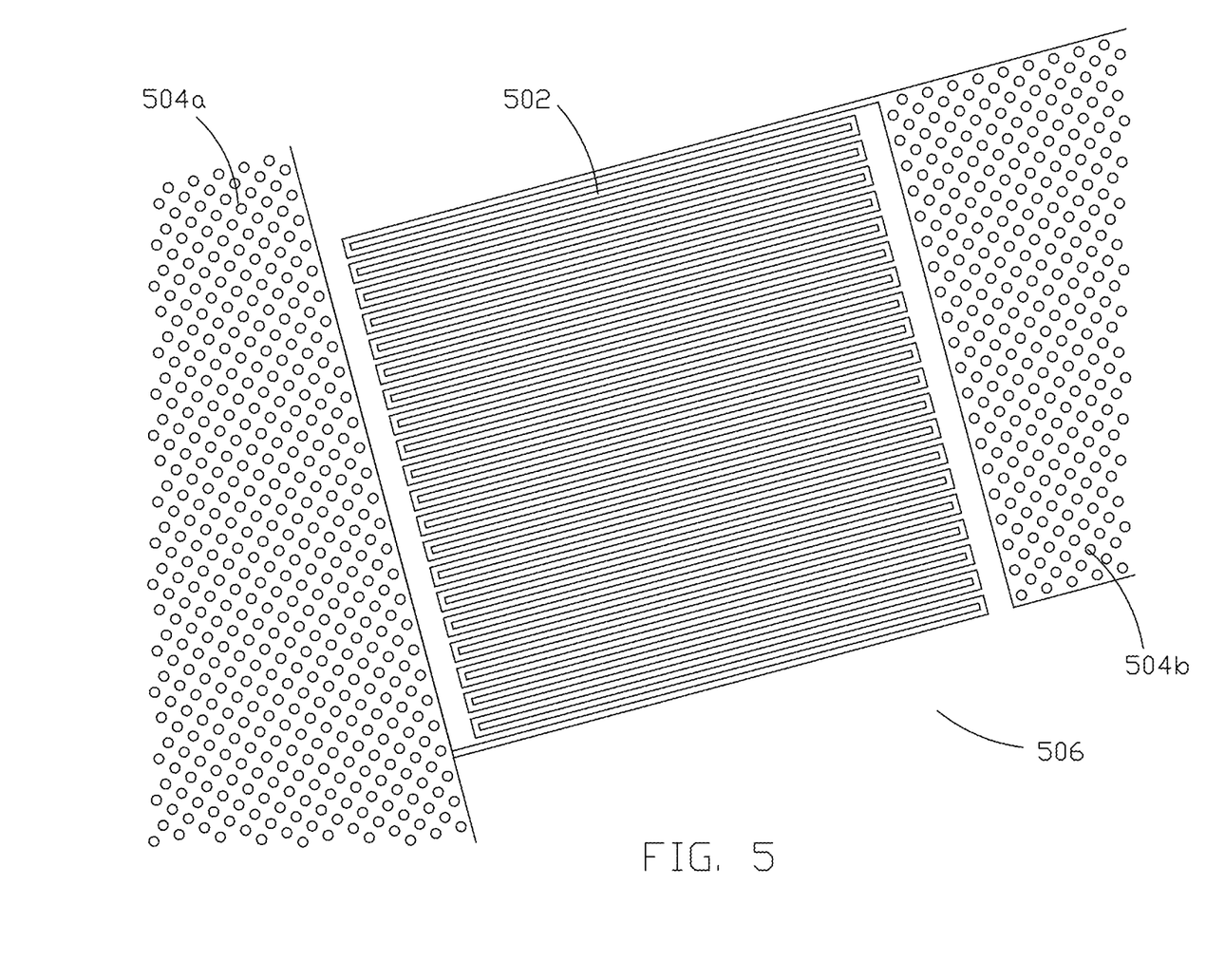
FIG. 5 illustrates a temperature sensor according an embodiment.

FIG. 5 illustrates a temperature sensor according an embodiment electrically coupled with electrical traces including voids. The temperature sensor 502 is configured as a resistance temperature detector electrically coupled with a first electrical trace 504a and a second electrical trace 504b. The temperature sensor 502 is configured as a serpentine line disposed on a polymer film 506. The serpentine line is electrically connected to the first electrical trace 504a at a first end of the serpentine line and is electrically connected to the second electrical trace 504b at a second end of the serpentine line. The electrical traces 504a,b are formed to have voids formed within the surface of the electrical traces to expose a portion of the polymer film 506 of the inner layer. According to an embodiment, the voids can be formed in a pattern within the electrical traces and other metal formations disposed on the inner layer to expose a desired percentage of the polymer film 506 of the inner layer. The exposed portion of the polymer film 506 of the inner layer increases the area available for the inner layer to adhere to the outer layer using the laminate techniques including those described herein to help prevent delamination between the inner layer and the outer layer.

Figure 6:
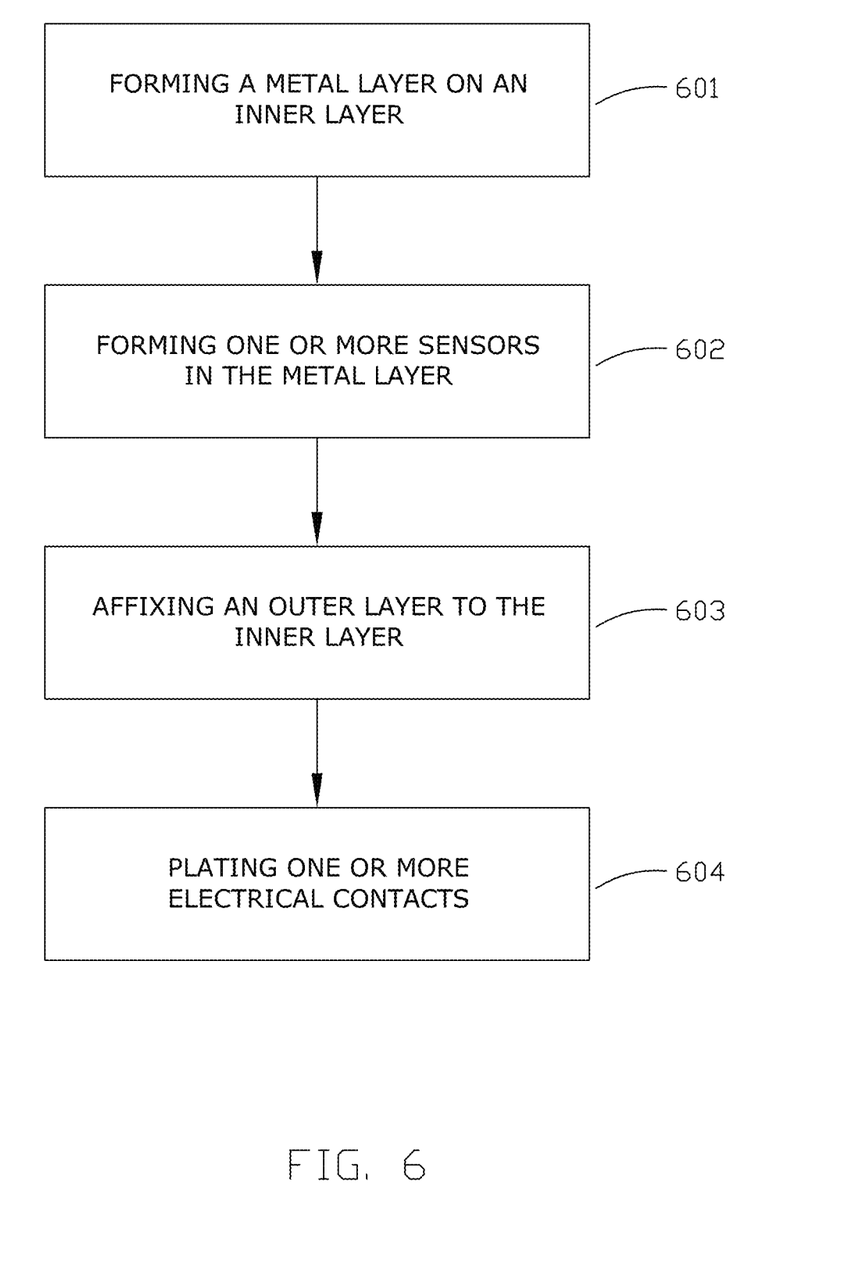
FIG. 6 illustrates flow diagram for a method for forming a sensor for a battery pouch according to an embodiment.

FIG. 6 illustrates a flow diagram for a method for forming a sensor for a battery pouch according to an embodiment. At step 601, one or more metal layers is formed on a polymer film to form an inner layer of a sensored battery pouch. One or more metal layers are formed on a polymer film using techniques including sputtering, electroless plating, chemical vapor deposition, or other techniques including those known in the art to form a metal layer. A metal layer can include nickel, nickel-chromium, platinum and other conductive materials. For some embodiments, platinum is used to form one or more strain gauges. At step 602, one or more sensors are formed in a metal layer. One or more electrical contacts for the one or more sensors are also formed in a metal layer at step 602. According to some embodiments, forming one or more sensors in a metal layer includes depositing a photoresist layer on the metal layer, such a polyimide layer, and patterning the photoresist layer. The photoresist layer is applied using techniques including, but not limited to, sputtering, chemical vapor deposition, thermal spray, and screen-printing techniques. For some embodiments, a platinum layer is disposed on an inner layer and nickel disposed on the same inner layer. The photoresist is patterned, for example, using photolithography and etching techniques including those known in the art. For embodiments, include a platinum layer, for example to form a strain gauge and a nickel layer, for example to form a resistance temperature detector, the nickel layer can be etched without affecting the platinum layer. Further, a nickel layer can be disposed directly on a platinum layer. Portions of the metal layer exposed by etching away portions of the photoresist layer are then etched to form sensors, electrical traces, electrical contacts, and other circuit components. According to some embodiments, laser ablation is used to form the sensors, electrical traces, electrical contacts, and other circuit components from the metal layer. At step 603, the outer layer of the battery pouch is affixed to the inner layer of the battery pouch using techniques including those described herein.

At step 604, the electrical contacts formed in a metal layer are plated. For some embodiments, the electrical contacts are plated with gold using an electroless nickel immersion gold (ENIG) technique such as those known in the art. According to some embodiments, the electrical contacts are gold plated after the outer layer is affixed to the inner layer of the sensored battery pouch. The entire sensored battery pouch including the outer layer is immersed in a bath for the gold plating of the exposed electrical contacts without using a mask. According to some other embodiments, the electrical contacts are gold plated before the outer layer is affixed to the inner layer of the battery pouch. This can be used, for example, when an outer layer cannot be immersed in a plating bath used for gold plating the electrical contacts. For example, the electrical contacts can be selectively plated by immersing an edge of the inner layer of the battery pouch that includes the electrical contact in a plating bath. According to some embodiments, a bandoleer vertical ENIG process is used to gold plate the electrical contacts. Then, the outer layer can be affixed to the inner layer of the battery pouch after the electrical contacts are gold plated.

Figure 7:
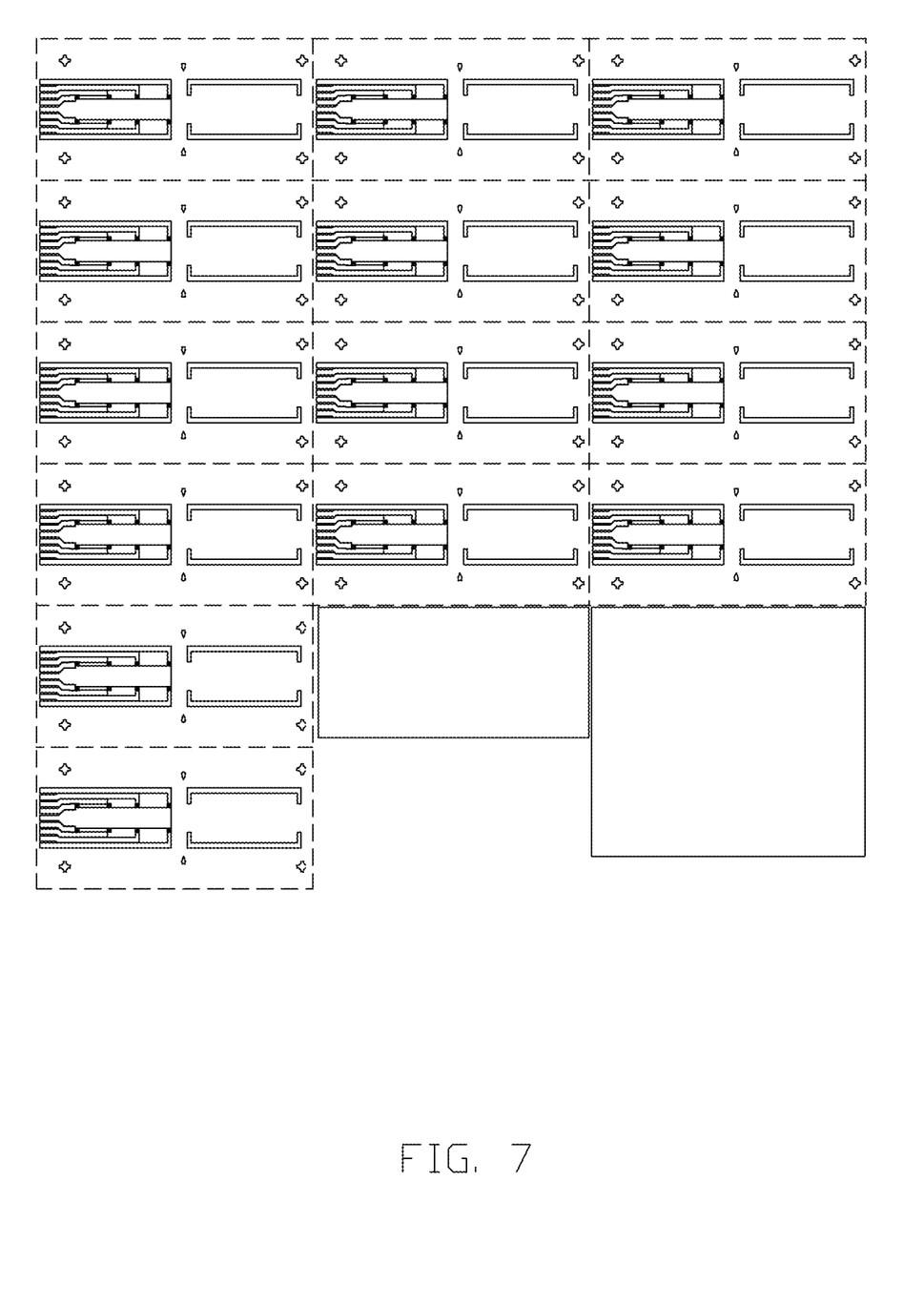
FIG. 7 illustrates a metal layer formed onto multiple portions of a polymer film according to an embodiment.

FIG. 7 illustrates a metal layer formed onto multiple portions of a polymer film to form multiple inner layers for a battery pouch using techniques including those describe herein. According to some embodiments, the polymer film is attached to a web of a reel to reel manufacturing process to form one or more sensors on the polymer film. The reel to reel manufacturing process forms the metal layer and forms the one or more sensors in the metal layer using techniques including those describe herein. The sheet of inner layers for the battery pouch with the sensors formed thereon can be slit cut using techniques including those known in the art to separate the sheet into separate rows of inner layers.

Figure 8:
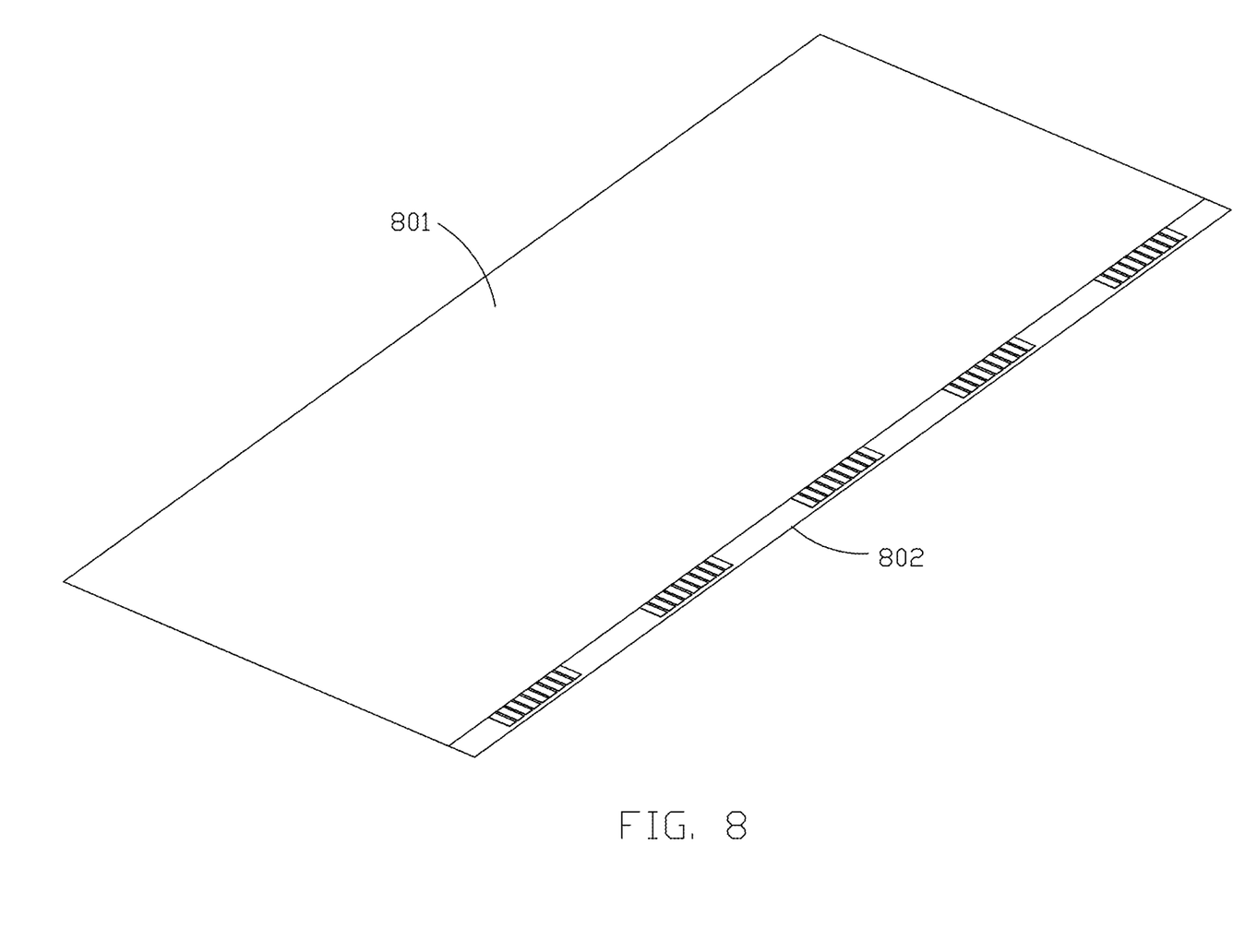
FIG. 8 illustrates a process for affixing an outer layer to multiple inner layers according to an embodiment.
Figure 9:
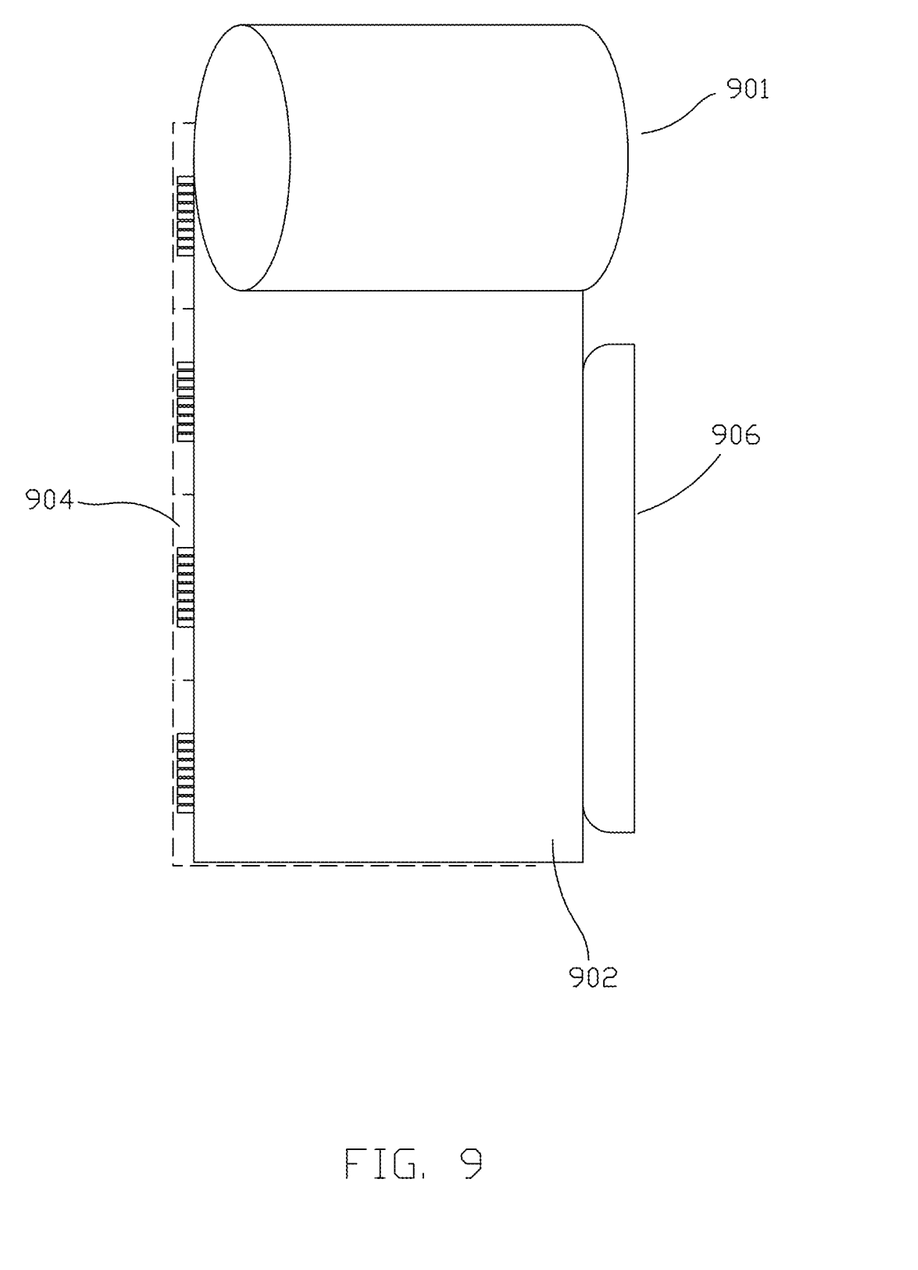
FIG. 9 illustrates a process for affixing an outer layer to multiple inner layers according to an embodiment.

FIG. 8 illustrates a process for affixing an outer layer to multiple inner layers according to an embodiment. As illustrated in FIG. 8, the outer layer of the battery pouch 801 is affixed to a row of inner layers 802. The individual battery pouches formed can then be separated in another step, for example by using slit cut techniques including those described herein. FIG. 9 illustrates a process for affixing an outer layer to multiple inner layers according to an embodiment. As illustrated in FIG. 9, a roll 901 of the outer layer 902 can be disposed on one or more rows of inner layers 904 and the outer layer 902 can be heat laminated on to the inner layers 904 using a fence 906 to apply the heat.

Figure 10:
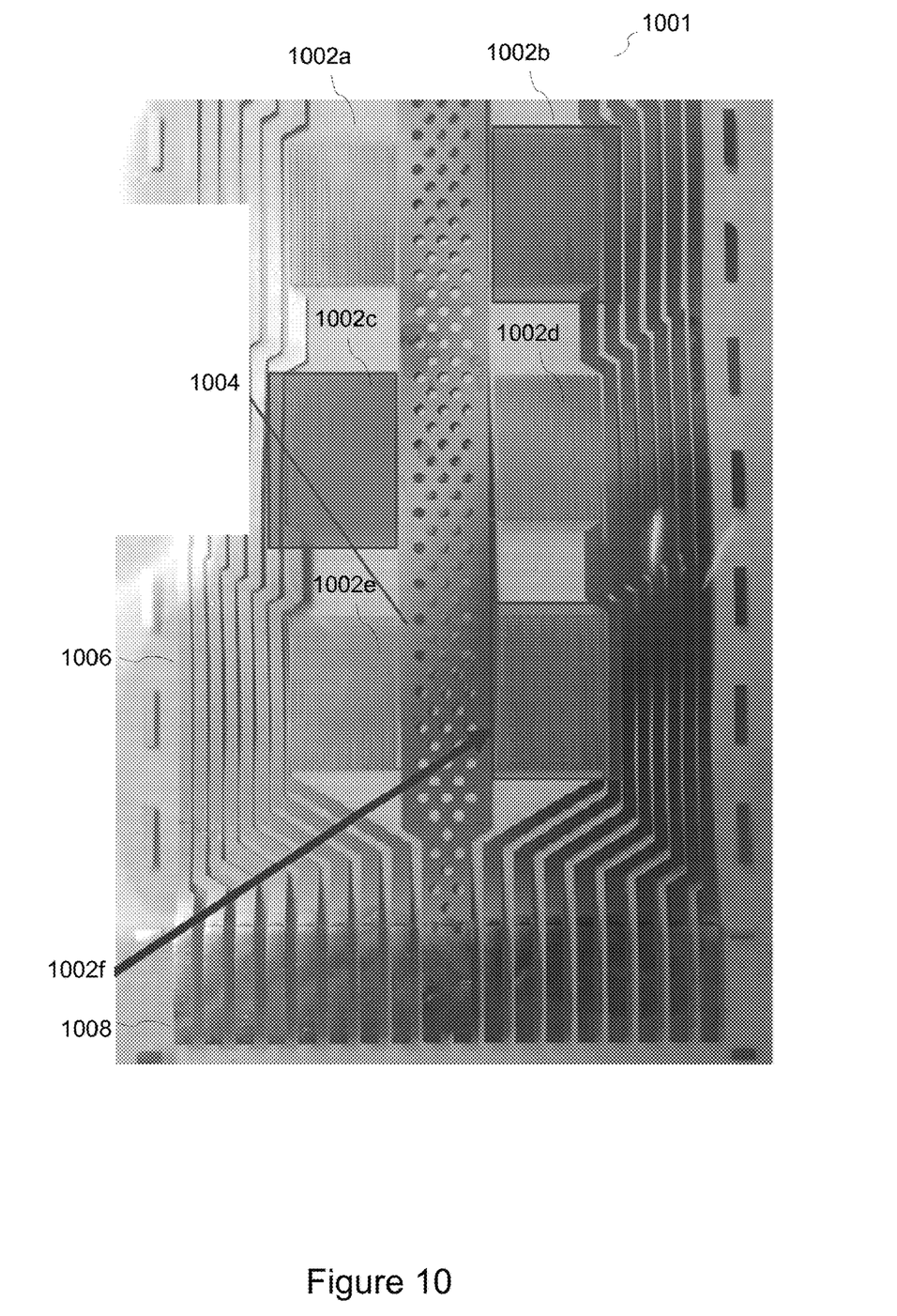
FIG. 10 illustrates an inner layer according to an embodiment including resistance temperature detectors and a capacitance plate.

FIG. 10 illustrates an inner layer according to an embodiment including resistance temperature detectors and a capacitance plate. The resistance temperature detectors 1002a-f are disposed on an inner layer 1001 using techniques including those described herein. The inner layer 1001 also includes a center ground line 1004 disposed on the inner layer 1004. The center ground line 1004 is configured as a ground contact for resistance temperature detectors 1002a-f. A first end of the each of the resistance temperature detectors 1002a-f is electrically coupled with the center ground line 1004 and a second end of each of the resistance detectors 1002a-f electrical traces 1006 electrically coupling each resistance temperature detectors and the capacitance plate 1004 to one or more respective electrical contacts 1008. The center ground line 1004 is also configured as a first plate for a capacitive plate sensor.

For some embodiments, the resistance temperature devices 1002*a-f* are each configured as temperature sensors and the center ground line 1004 is paired with a second plate to form a capacitive plate sensor to use as a pressure/gap sensor. For some embodiments, the second plate of the capacitance sensor is a ground plate of a battery cell. For other embodiments, the second plate is disposed on a second inner layer inside a battery pouch. The battery pouch also includes a swelling sensor/gas sensor 1106 in the form of a strain gauge.

For various embodiments, one or more of the resistance temperature devices 1002*a-f* are configured as a resistive heating element using techniques including those described herein. A battery pouch including such an inner layer 1001 including a temperature sensor, a gas pressure sensor, and heater for a battery pre-warmer would enable checking for gas pressure of a battery using alternating current, monitoring temperature with some of the resistance temperature detectors, and supplying heat to the battery by running current through at least some of the resistance temperature detectors.

Figure 11:
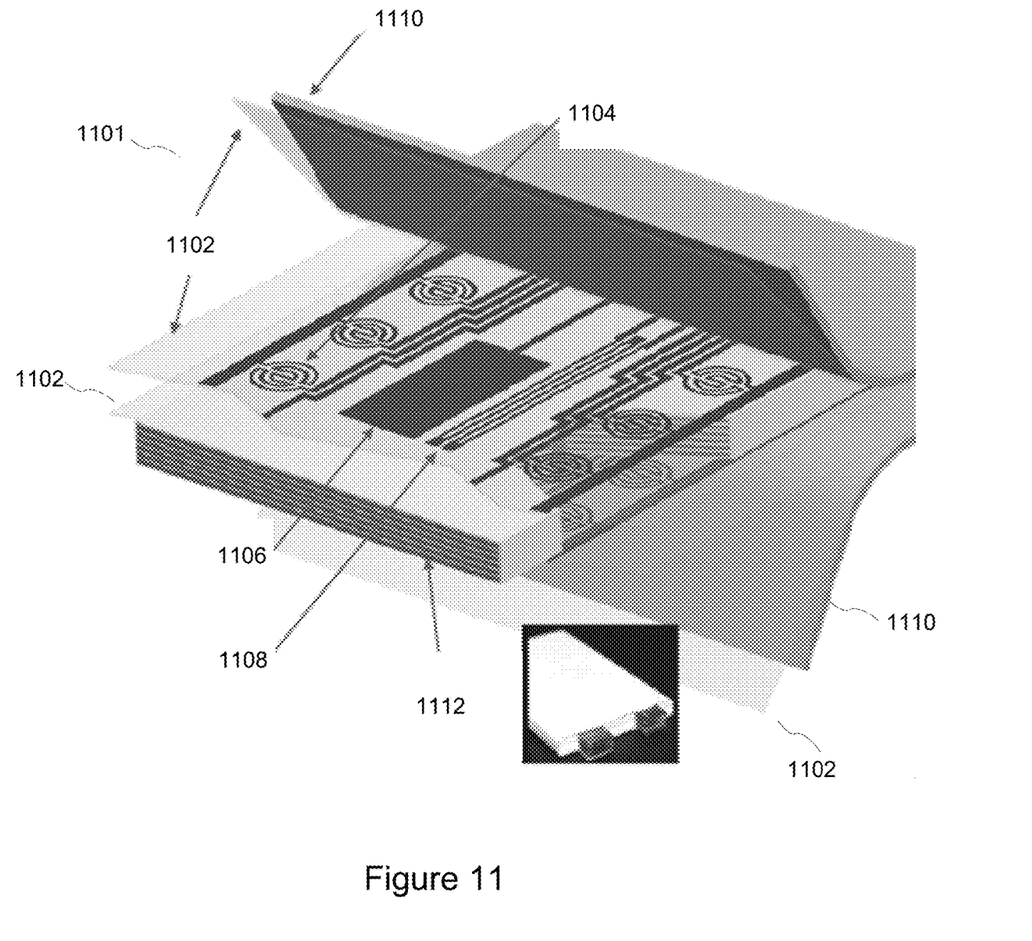
FIG. 11 illustrates a battery pouch including sensors according to an embodiment.

FIG. 11 illustrates a battery pouch including sensors according to an embodiment. The battery pouch 1101 includes several inner layers 1102. One of the inner layers 1102 includes several sensors. The sensors include resistance temperature detectors 1104. These can be configured as a temperature sensor, a heater, and both using techniques including those described herein. The sensors also includes a strain gauge 1108 configured as a swelling sensor/gas pressure sensor. The sensors are illustrated as being disposed in one of the inner layers 1102; however, embodiments include those having sensors formed on more than one inner layer using techniques including those described herein. Other inner layers 1102 are disposed in the battery pouch between the sensors and other layers to isolate the sensors from the other layer, for example to prevent the sensor from coming in electrical contact with another conductive material to create a short circuit. The battery pouch 1101 includes outer layers 1110, such as those described herein. The outer layers 1110 enclose the inner layers 1102 and the batter cell 1112 using techniques including those described herein.

Figure 12:
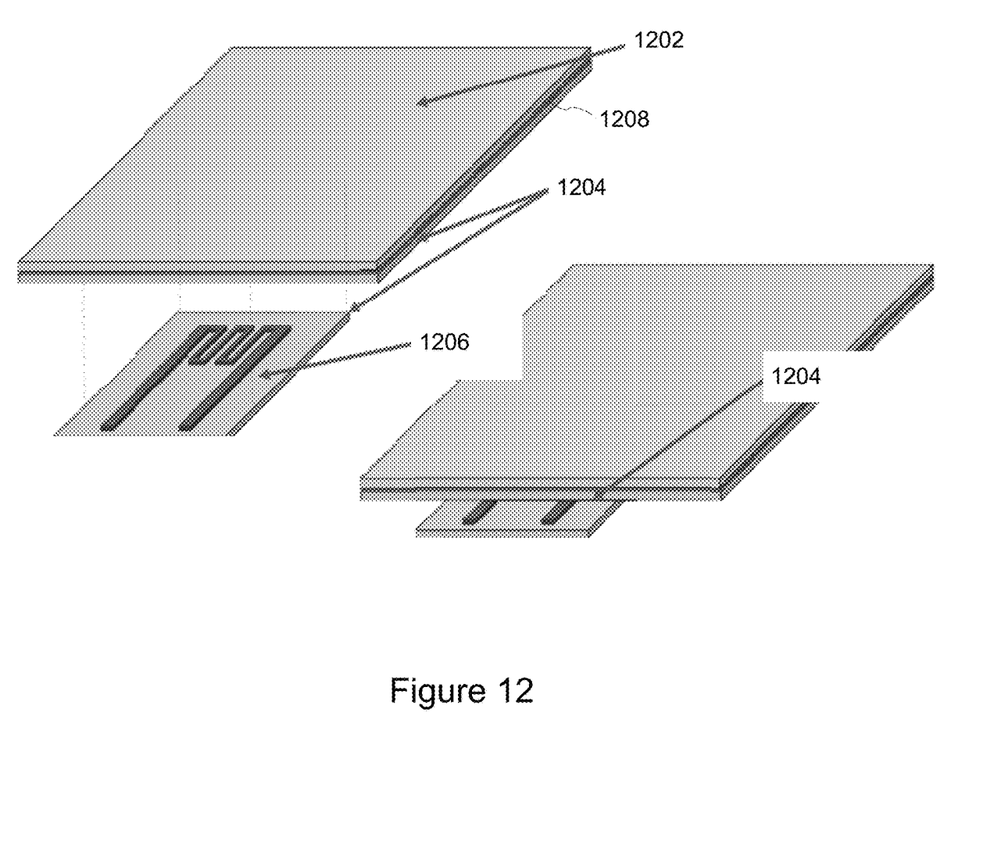
FIG. 12 illustrates a inner layer including a sensor attached to an outer layer according to an embodiment.

FIG. 12 illustrates a inner layer including a sensor attached to an outer layer according to an embodiment. The inner layer 1204 includes a sensor 1206 such as those described herein. The outer layer 1202 is affixed to the inner layer 1206 using an adhesive, such as a non-conductive adhesive; heat sealing tape; or other material. For other embodiments, a conductive adhesive could be used to electrically or thermally couple a sensor or other circuit to an outer layer 1202. For some embodiments, the adhesive commonly used to laminate the outer layer is used as an insulator between the sensors and the rest of the battery pouch. The adhesive then serves two purposes, insulator between the sensors and the outer layer, such as an aluminum layer, of the battery pouch and adhesion of a sensor layer to the battery pouch. The sensor layer also serves the original purpose of sealing the pouch when the cells are assembled and placed into the battery pouch. Yet, other embodiments would include metallic circuitry being covered with an addition layer or layers of material prior to being assembled with the battery pouch material. Since the sensors would be encased in protective material at this time, the sensor circuit would not necessarily need to be sealed to the inner surface of the battery pouch to encase the metallic sensors. A top insulating layer, if used, could be a patterned or unpatterned polypropylene film, a solder mask, a patterned heat seal tape, or other material. For some embodiments, the sensor circuit can cover the full size of the battery pouch. This can include sensors of one or more type located on both sides of the battery, either by utilizing a one piece inner layer including sensors folded over a battery cell so that sensors are on both sides of the battery cell. Alternatively, embodiments include using two or more inner layers including one or more sensors of one or more type on each inner layer with each inner layer affixed to the inner surface of the battery pouch such that sensors are disposed on both sides of a battery cell where desired. The sensors can be designed to cover a small portion of a battery pouch. For example, just a small portion of one face of the battery cell may be covered. The amount of sensing coverage area may be a cost versus performance tradeoff, so the most likely implemented design would be optimized for both cost and performance.

Figure 13:
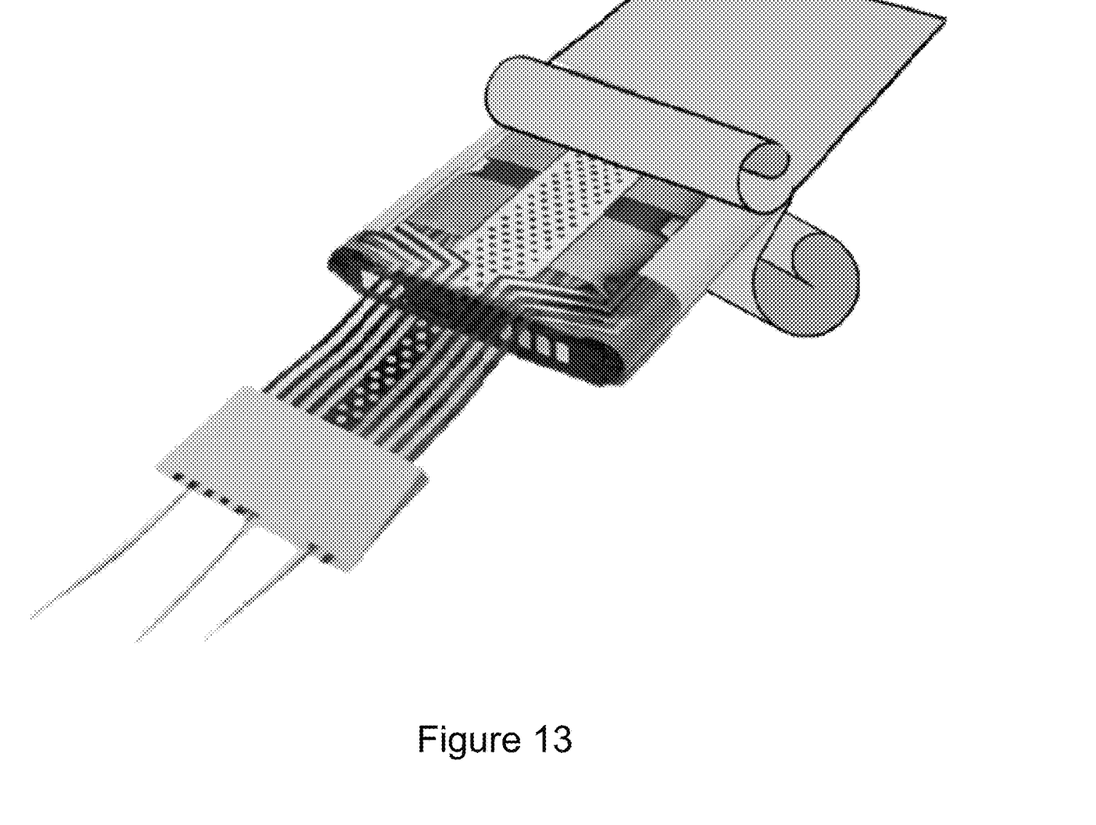
FIG. 13 illustrates a battery pouch including one or more sensors according to an embodiment.

FIG. 13 illustrates a battery pouch including one or more sensors according to an embodiment. The sensors are disposed on one or more inner layers of the battery pouch using techniques including those described herein. The inner layers are disposed on a battery cell which is enclosed by outer layers to form a battery pouch using techniques including techniques described herein. Electrical contacts extend beyond the outer layers to enable electrically coupling the one or more sensors to circuits external to the battery pouch. For example, the one or more sensors may be electrical coupled with an external battery management system configured to perform the battery monitoring functions for any number of battery cells and interface to sensors directly or indirectly through a controller using one of several industry communication methods, such as PC or other communication interfaces. For some embodiments, the electrical contacts may be unplated and could be connected to the outside electronics using Anisotropic Conductive film ("ACF") techniques, zero insertion force connectors, or other methods. The electrical contacts could be contained within the sealed battery section, in this case a flex circuit or alternative wiring harness would cross the sealed barrier and connect to the sensor circuit internally. This may require sealing the connections so that they are isolated from the battery electrolyte.

The sensors including an array of one or more of any type of sensor described herein may be integrated with a charging controller, instead of a battery cell, to enable optimal charging time in a safe manner, increase life, increase cycle counts before degradation, shut down operation in the event of a critical condition.

Although described in connection with these embodiments, those of skill in the art will recognize that changes can be made in form and detail without departing from the spirit and scope of the invention.

What is claimed is:

1. A battery pouch comprising:
an outer layer folded to form the battery pouch; and
an inner layer disposed on the outer layer, the inner layer having an inner surface and including an outer surface facing towards the outer layer and including a set of sensors disposed on the outer surface of the inner layer such that the set of sensors are positioned between the inner layer and the outer layer, each of the set of sensors connected to electrical traces that electrically connect each sensor with any of a set of electrical contacts configured to extend beyond the outer layer, wherein a first sensor of the set of sensors comprises a serpentine pattern disposed on the outer surface of the inner layer and is connected to a first electrical trace at a first end of the first sensor and connected to a second electrical trace at a second end of the first sensor, the second end of the first sensor is opposite to the first end of the first sensor, wherein the first electrical trace and the second electrical trace comprise voids formed within a surface of each of the first electrical trace and the second electrical trace according to a pattern to expose a portion of a polymer film of the inner layer, wherein the at least one sensor is formed in the inner layer by disposing a metal portion on the polymer film to form the inner layer, depositing a photoresist layer on the metal portion, and etching a portion of the metal portion on the photoresist layer to form the at least one sensor.

2. The battery pouch of claim 1, wherein the at least one sensor is a resistance temperature detector.

3. The battery pouch of claim 1, wherein the at least one sensor includes an array of resistance temperature detectors.

4. The battery pouch of claim 3, wherein the array of resistance temperature detectors includes eight resistance temperature detectors.

5. The battery pouch of claim 1, wherein the at least one sensor is a pressure sensor.

6. The battery pouch of claim 5, wherein the pressure sensor is a strain gauge.

7. The battery pouch of claim 5, wherein the pressure sensor is a capacitive sensor.

8. The battery pouch of claim 1, wherein the at least one sensor is formed onto a surface of the inner layer.

9. The battery pouch of claim 4, wherein at least one resistance temperature detector of the array of resistance temperature detectors is configured as a heater.

10. A battery pouch comprising:
a plurality of sensors fabricated and arrayed onto a polymer film which is bonded to an inner layer of the battery pouch, the inner layer having an inner surface in close proximity to one or more faces of a battery cell of a finished battery and an outer surface opposite to the inner surface, the polymer film is disposed on the outer surface of the inner layer, the plurality of sensors connected to the battery cell via a set of electrical contacts, wherein each sensor connects to the set of electrical contacts via electrical traces, the set of electrical contacts configured to extend beyond the outer layer and configured to provide electrical communication with the plurality of sensors arrayed onto the polymer film and bonded to the inner layer, wherein a first sensor of the set of sensors comprises a serpentine pattern disposed on the outer surface of the inner layer and is connected to a first electrical trace at a first end of the first sensor and connected to a second electrical trace at a second end of the first sensor, the second end of the first sensor is opposite to the first end of the first sensor, wherein the first electrical trace and the second electrical trace comprise voids formed within a surface of each of the first electrical trace and the second electrical trace according to a pattern to expose a portion of the polymer film of the inner layer, wherein the plurality of sensors are fabricated to the inner layer of the batter pouch by: disposing a metal portion on the polymer film to form the inner layer, depositing a photoresist layer on the metal portion, and etching a portion of the metal portion on the photoresist layer to form the plurality of sensors.

11. The battery pouch of claim 10, wherein the polymer film is a heat bondable material.

12. The battery pouch of claim 11, wherein the heat bondable material is a polypropylene film.

13. The battery pouch of claim 10, wherein one sensor of the plurality of sensors is configured as one or more of any one or more of a resistance temperature detector, a thermocouple, a thermopile, and thermistor.

14. A battery pouch comprising:
a plurality of sensors fabricated and arrayed onto one or more polymer films, the battery pouch including an inner layer and an outer layer, the inner layer having an inner surface in close proximity to one or more faces of a battery cell disposed in the battery pouch and an outer surface opposite to the inner surface via a set of electrical contacts, wherein each sensor is connected to the set of electrical contacts via electrical traces, the set of electrical contacts configured to extend beyond the outer layer and configured to provide electrical communication with the plurality of sensors arrayed onto one or more polymer films, the polymer film is bonded to the outer surface of the inner layer of the battery pouch, wherein a first sensor of the set of sensors comprises a serpentine pattern disposed on the outer surface of the inner layer and is connected to a first electrical trace at a first end of the first sensor and connected to a second electrical trace at a second end of the first sensor, the second end of the first sensor is opposite to the first end of the first sensor, wherein the first electrical trace and the second electrical trace comprise voids formed within a surface of each of the first electrical trace and the second electrical trace according to a pattern to expose a portion of the one or more polymer films of the inner layer, wherein the plurality of sensors are fabricated to the inner layer of the batter pouch by: disposing a metal portion on the one or more polymer films to form the inner layer, depositing a photoresist layer on the metal portion, and etching a portion of the metal portion on the photoresist layer to form the plurality of sensors.

15. The battery pouch of claim 14, wherein the one or more polymer films is a heat bondable material.

16. The battery pouch of claim 15, wherein the heat bondable material is a polypropylene film.

17. The battery pouch of claim 14, wherein at least one of the plurality of sensors is a resistance temperature detector.

18. The battery pouch of claim 17, wherein the resistance temperature detector is configured as a heater.

* * * * *